United States Patent
Schanzenbach et al.

(10) Patent No.: US 8,653,775 B2
(45) Date of Patent: Feb. 18, 2014

(54) METHOD AND DEVICE FOR CONTROLLING AN ELECTRIC MOTOR

(75) Inventors: Matthias Schanzenbach, Eberstadt (DE); Juergen Hachtel, Moeckmuehl (DE); Markus Baumert, Freiberg (DE)

(73) Assignee: Robert Bosch GmbH, Stuttgart (DE)

( * ) Notice: Subject to any disclaimer, the term of this patent is extended or adjusted under 35 U.S.C. 154(b) by 918 days.

(21) Appl. No.: 12/086,832

(22) PCT Filed: Nov. 23, 2006

(86) PCT No.: PCT/EP2006/068849
§ 371 (c)(1),
(2), (4) Date: Jul. 6, 2010

(87) PCT Pub. No.: WO2007/071520
PCT Pub. Date: Jun. 28, 2007

(65) Prior Publication Data
US 2010/0270961 A1    Oct. 28, 2010

(30) Foreign Application Priority Data
Dec. 20, 2005  (DE) .................. 10 2005 060 859

(51) Int. Cl.
*H02P 1/04*  (2006.01)

(52) U.S. Cl.
USPC ............ 318/430; 388/800; 388/809; 388/811

(58) Field of Classification Search
USPC ........................ 318/430; 388/800, 809, 811
See application file for complete search history.

(56) References Cited

U.S. PATENT DOCUMENTS

| | | | | |
|---|---|---|---|---|
| 5,483,141 | A * | 1/1996 | Uesugi | 318/811 |
| 6,104,151 | A * | 8/2000 | Tsai | 318/400.11 |
| 6,236,176 | B1 * | 5/2001 | Uebelein et al. | 318/287 |
| 6,329,781 | B1 * | 12/2001 | Matsui et al. | 318/717 |
| 6,422,331 | B1 * | 7/2002 | Ochiai et al. | 180/65.25 |
| 6,559,611 | B1 * | 5/2003 | Satake et al. | 318/145 |
| 6,882,122 | B1 * | 4/2005 | Sutter et al. | 318/400.21 |
| 7,279,855 | B2 * | 10/2007 | Tahara et al. | 318/46 |
| 2004/0041535 | A1 * | 3/2004 | Toyoda | 318/700 |
| 2004/0056622 | A1 * | 3/2004 | Mayhew et al. | 318/459 |
| 2004/0099234 | A1 * | 5/2004 | Tamai et al. | 123/179.3 |
| 2004/0155622 | A1 * | 8/2004 | Mayhew et al. | 318/778 |
| 2004/0169481 | A1 * | 9/2004 | Wakitani et al. | 318/376 |
| 2005/0062458 | A1 * | 3/2005 | Koch et al. | 320/132 |
| 2005/0134207 | A1 * | 6/2005 | Ishikawa | 318/151 |

(Continued)

FOREIGN PATENT DOCUMENTS

| | | |
|---|---|---|
| DE | 43 02 515 | 12/1993 |
| DE | 199 08 007 | 4/2000 |
| DE | 199 44 194 | 3/2001 |
| DE | 101 02 885 | 8/2002 |

(Continued)

*Primary Examiner* — Kawing Chan
(74) *Attorney, Agent, or Firm* — Kenyon & Kenyon LLP (57) ABSTRACT

A method and a device for controlling and/or regulating an electric motor. Such electric motors are used for example in motor vehicles in the form of pump motors. In general, the electric motor is supplied with electrical energy from a battery and/or using a generator. The controlling and regulation take place using a high-frequency pulse width modulation (PWM). When the electric motor is started, the PWM is used to continuously increase the motor current required for the operation of the electric motor, e.g. beginning from 0.

2 Claims, 3 Drawing Sheets

(56) References Cited

U.S. PATENT DOCUMENTS

| | | |
|---|---|---|
| 2005/0253393 A1* | 11/2005 | Senda et al. .................... 290/7 |
| 2005/0264246 A1* | 12/2005 | Beulich et al. ................ 318/254 |
| 2006/0091836 A1* | 5/2006 | Oyobe et al. ................ 318/149 |
| 2006/0152180 A1* | 7/2006 | Tahara et al. ................ 318/139 |
| 2006/0181235 A1* | 8/2006 | Imaie et al. ................ 318/375 |
| 2007/0140669 A1* | 6/2007 | Schanzenbach et al. ..... 388/811 |

FOREIGN PATENT DOCUMENTS

| | | |
|---|---|---|
| ET | 1 039 623 | 9/2000 |
| JP | 6-249483 | 9/1994 |
| JP | 7-222470 | 8/1995 |
| WO | 98/40945 | 9/1998 |
| WO | WO 2004089681 A1 * | 10/2004 |

* cited by examiner

METHOD AND DEVICE FOR CONTROLLING AN ELECTRIC MOTOR

FIELD OF THE INVENTION

The present invention is based on a method and a device for operating an electric motor controlled by pulse width modulation in a direct-voltage network.

BACKGROUND INFORMATION

German patent document DE 199 44 194 A1 discusses a method and device in which the output stage of an electronically commutatable motor is controlled via an electronic control unit using pulse-width-modulated signals. Here, the electric motor is supplied with voltage pulses from a direct-current network corresponding to the control voltage pulses specified by a target value stage.

SUMMARY OF THE INVENTION

The exemplary embodiments and/or exemplary methods of the present invention is to a method and a device for controlling and/or regulating an electric motor. Such electric motors are used for example in motor vehicles in the form of pump motors. In general, the electric motor is supplied with electrical energy from a battery and/or using a generator. The controlling and/or regulation take place using a high-frequency pulse width modulation (PWM). The basic idea of the invention is that when the electric motor is started the PWM is used to continuously increase the motor current required for the operation of the electric motor, e.g. beginning from the value 0.

The advantage of such a controlling of the electric motor is that it makes it possible to avoid current peaks that can result from the large startup currents that occur when electric motors are started. Such current peaks can cause damage to the battery. In addition, these current peaks can cause a dynamic voltage drop, which can cause failure of other consumers also supplied by the battery and/or by the generator.

Therefore, the current gradient with which the motor current is continuously increased is advantageously limited to a prespecified maximum value.

The maximum value, which can also be realized as a target value, can be prespecified dependent on operating parameters of the battery and/or of the generator. Typical operating parameters here are the discharge current of the battery and/or the current increase produced by the generator. In addition, however, the constructive design of the generator can be used to specify the maximum value, for example by determining the maximum rate of current rise that can be achieved by the generator. The latter is defined as the current that can be produced by the generator within a specified period of time.

In order to limit the increase of the motor current, or the current gradient, in an embodiment of the invention it can be provided to limit the rotational speed of the electric motor. Here, for example a maximum target rotational speed can be used that is prespecified dependent on the battery voltage. Another possibility is to take into account the load moment at the electric motor, or that has to be applied by the electric motor, in the determination of the maximum target rotational speed.

In addition, in an embodiment of the invention it is provided that the battery or generator provided for the operation of the electric motor also supplies energy to additional electrical consumers. In this way, the exemplary embodiments and/or exemplary methods of the present invention prevents failure of these additional consumers when current peaks occur during the startup of the electric motor. In a development of the exemplary embodiments and/or exemplary methods of the present invention, it can also be provided that the continuous increase of the motor current, or the current gradient to which this increase is limited, is made dependent on the supplying of the additional consumers with electrical energy. Thus, for example, the current requirement for additional consumers in a vehicle, such as the heating system, the lights, or an ACC (Adaptive Cruise Control) system, can be taken into account in order to determine the allowable current gradient.

In a specific development of the exemplary embodiments and/or exemplary methods of the present invention, it is provided that only the electric motor is supplied with electrical energy by the generator, while the additional electrical consumers are supplied to the greatest possible extent by the electrical energy from the battery. Here, it is also conceivable for this separation of the supplying to take place only during the startup phase of the electric motor.

Further advantages result from the following description of exemplary embodiments.

DETAILED DESCRIPTION

During the operation of the electric motor, the startup phase has a high current requirement. If the electric motor is supplied with electrical energy by a battery, a drop in the supply voltage provided by the battery can occur. This dynamic voltage drop can have an adverse effect on other consumers that are also connected to the battery. Especially during the startup of an electrical (pump) motor in a vehicle, for example during pressure buildup in an electro-hydraulic braking system, such a temporarily lowered supply voltage can cause problems in other electrical components in the vehicle.

As a remedy, according to the exemplary embodiments and/or exemplary methods of the present invention the energy supplied to the motor, or the supplied motor current, is increased slowly in order to avoid undesired high current peaks, and to protect the on-board electrical system of the vehicle.

Figure 1:
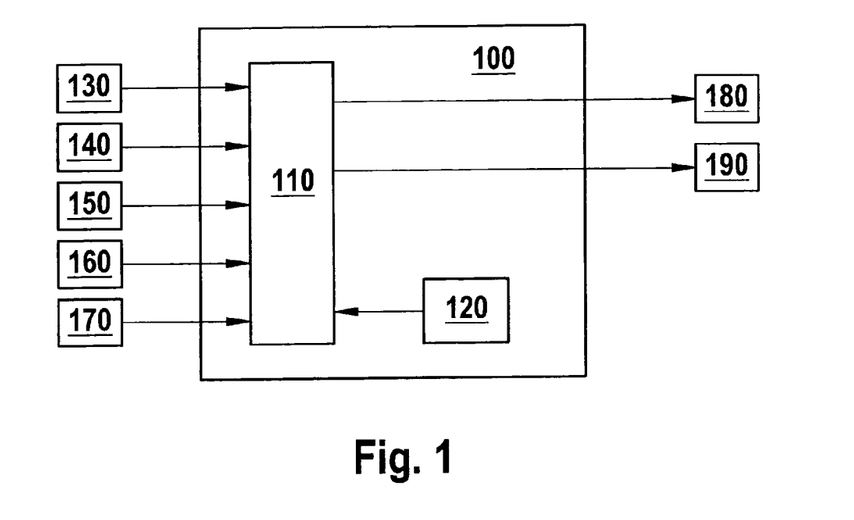
FIG. 1 schematically shows, in a block switching diagram, a device according to the present invention for controlling or regulating an electric motor.

FIG. 1 schematically shows a possible device with which a slow, continuous increase of the motor current at electric motor 180 can be achieved. Here, in a control device 100 there is provided a processing unit 110, for example in the form of a microprocessor or an ASICS, that evaluates external data and from these data derives control signals that control or regulate electric motor 180 and, if warranted, a generator 190 also present in the vehicle.

As external data, operating parameters of the electric motor itself can be acquired that are recorded by a suitable arrangement 130 and forwarded to processing unit 110. Operating parameters can also include the pressure ratio in the hydraulic branch before and after a pump motor, which can be determined using pressure sensors or models. In addition, however, prespecified control parameters of the electric motor can also be acquired as operating parameters and can be optionally stored in a suitable storage device directly on the electric motor or in the control device. Such a storage device is schematically represented by block 120.

In addition, for the initiation of the continuous current increase, it is necessary that a request for the startup of the electric motor be acquired by a corresponding device 140. In addition, this device can also query the required load moment for the electric motor and can pass this information to processing unit 110, so that this unit can take this information into account in the controlling.

If a generator 190 is present in the vehicle in which control device 100 is used, its operating parameters can also be used for the production of the control signals of electric motor 180. For this purpose, the current operating state of generator 190 is acquired, for example using a suitable arrangement 150. In addition, it is also conceivable that specific design parameters of generator 190 can be taken into account that can be stored in a storage device at the generator or in the control device. Specific design parameters can include for example the maximum rate of current rise that can be produced by the generator, i.e., the current that can be generated within a specified time period.

In addition, the state of battery 160 is acquired and taken into account for the controlling of electric motor 180. This may be the battery's charge status or the load on the battery by other consumers. However, it is also possible to use a suitable arrangement 170 to purposively acquire the required supply power of the other consumers, in order to produce a prognosis of the load on battery 160. Such a prognosis can also contribute to the controlling of electric motor 180, for example if the battery is the only voltage supply for the consumers under consideration.

In another exemplary embodiment, it can also be provided that generator 190 is also capable of being operated dependent on the acquired data and/or dependent on the controlling of electric motor 180.

Figure 2:
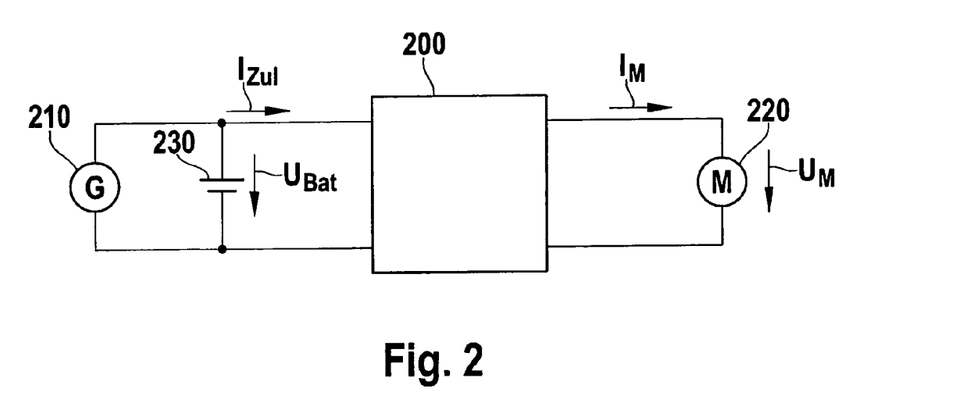
FIG. 2 shows a corresponding switching diagram.

FIG. 2 shows a schematic block switching diagram in which control device 200 controls electric motor 220 using a motor voltage $U_M$ or a motor current $I_M$. Typically, such a controlling is carried out using a (high-frequency) pulse width modulation. The energy supply to control device 200 or to electric motor 220 is provided in the present case by a battery 230 that supplies a battery voltage $U_{Bat}$, and by a generator 210. Through the combination of the battery and the generator, control device 200 or electric motor 220 can be supplied with a higher current $I_{Zul}$.

Because the generator and the battery in the vehicle are standardly connected in parallel and the generator is limited to a certain rate of current rise (e.g. 300 to 1000 A/s), when there is a jump-type switching on of the motor the current is supplied from the battery. These high currents can damage the battery. Through the specification of a maximum current gradient, i.e. a defined current increase in a specified time period in the controlling of the motor during startup, such damage can be avoided. If, in addition, the current gradient is adapted to the rate of current rise of the generator, the motor current required to run up the motor can be produced completely by the generator of the vehicle. This protects the battery against high current jumps. In addition, such a controlling avoids dynamic voltage drops in the on-board electrical system, because the battery is relieved of stress.

Figure 4:
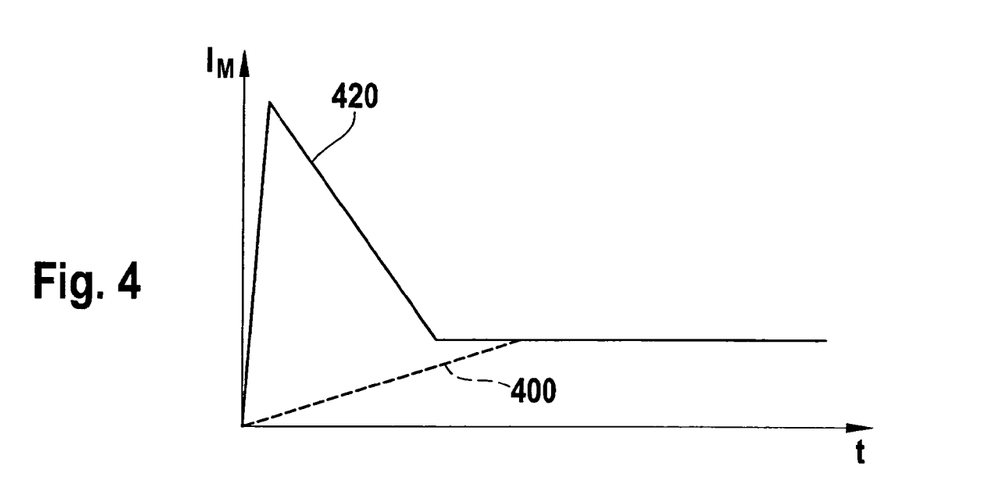
FIG. 4 shows a comparison of the motor current with and without current gradient limiting.

The comparison of the load of a motor startup with and without current gradient limitation is shown in FIG. 4. Here, the motor current $I_M$ required to start up the motor is plotted over time t. The curve according to 420 shows motor current $I_M$ without current limitation having a very high current peak shortly after the start of the runup. In contrast, the dashed curve according to 400 shows a continuous curve that after a certain time goes over into a constant current requirement for the operation of the motor, as does the curve according to 420.

In another exemplary embodiment, different current gradients can also be set that are required according to the hydraulic power requirements of an ESP controller in the vehicle.

Because the electric motor typically also has a rotational speed control unit, the setting of the maximum current gradient can be carried out by specifying a target rotational speed. In a particular exemplary embodiment, the maximum target rotational speed used in this way is calculated as follows:

$$\omega_i^{j+1} = \frac{1}{k_8}(\Delta i_{batt}^{max} - k_9)$$

Figure 3:
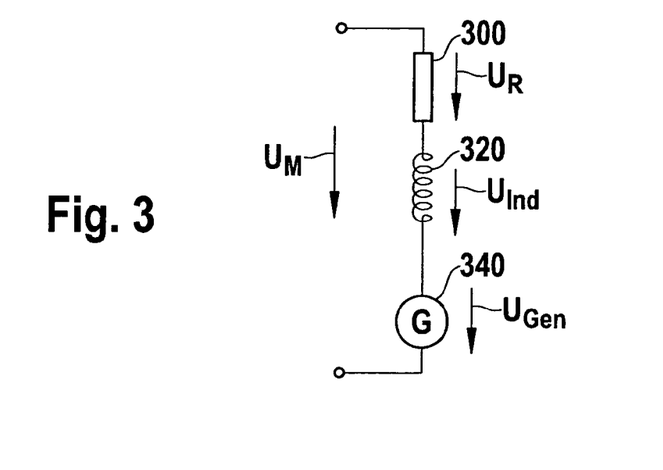
FIG. 3 shows an "equivalent circuit" diagram of the electric motor.

The maximum target rotational speed can be derived as follows:

As can be shown on the basis of an equivalent circuit diagram of the electric motor (see FIG. 3), the motor voltage $U_M$ can be divided into different partial voltages $U_R$ (allocated to ohmic resistance 300 of the motor), $U_{Ind}$ (allocation to the inductive resistance 320 of the motor), and $U_{Gen}$ (allocation to the generator portion 340 of the motor).

The system equations of the motor can be derived from the voltage balance and the principle of conservation of angular momentum, and are as follows:

$$J\frac{d\omega}{dt} = Ki - T_{load} \quad (1.1)$$
$$L\frac{di}{dt} = U - Ri - K\omega$$

The quantities here are the armature current i and the rotational speed ω. The parameters are inductance L, moment of inertia J, motor constant K, and resistance R. The inputs to the system are the manipulated quantity supply voltage U and load moment $T_{load}$. The load moment is dependent on the pressures adjacent to the pump elements and on the rotational speed. To a first approximation, the rotational speed dependence can be ignored.

Thus, the load moment is made up of a constant friction portion and a pressure-dependent load portion:

$$T_{load} = T_{fric} + k_{load}(p_{ds} - p_{ss}).$$

Here, $p_{ds}$ is the pressure at the pressure side and $p_{ss}$ is the pressure at the suction side, whose values are taken for example from HIM (hydraulic model of the ESP) or can be acquired directly by pressure sensors. Thus, the load moment can be presumed to be known.

In the following, supply voltage U is calculated in such a way that the desired target rotational speed results. The basis of this is the theory of flat systems.

If, as output, rotational speed ω is selected $$y=\omega \quad (1.2),$$

through a first differentiation and placement into the system equations (1.1) a relation is obtained between armature current i and angular acceleration:

$$\dot{y} = \dot{\omega} = \frac{1}{J}(Ki \cdot T_{load}) \Rightarrow i = \frac{1}{K}(J\dot{\omega} + T_{load}). \quad (1.3)$$

Further differentiation yields the supply voltage U:

$$\dot{y} = \ddot{\omega} = \frac{K}{JL}(U - Ri - K\omega) + \frac{\dot{T}_{load}}{J}. \quad (1.4)$$

Solving for U yields the following:

$$U = \frac{JL}{K}\ddot{\omega} + \frac{RJ}{K}\dot{\omega} + K\omega + \frac{R}{K}T_{load} + \frac{L}{K}\dot{T}_{load}. \quad (1.5)$$

This equation can be simplified due to the small influence of the inductance. By putting in the target quantities, a controlling is thus obtained that moves the system along the target trajectory $\omega_d$:

$$U^d = \frac{RJ}{K}\dot{\omega}_d + K\omega_d + \frac{R}{K}T_{load}. \quad (1.6)$$

Here, the first term takes into account the inertia of the motor, the second term takes into account the voltage induced by the rotation, and the third term takes into account the voltage required due to the load moment.

Planning the Target Trajectory

Figure 5A:
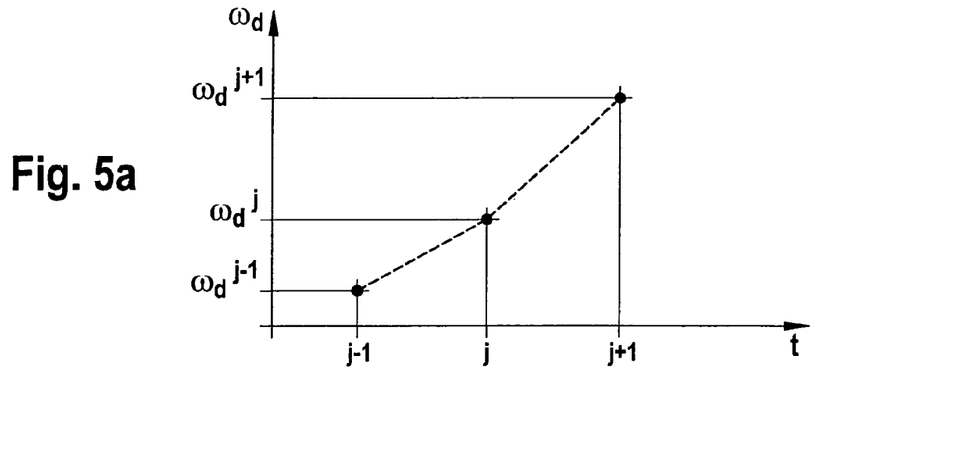
FIG. 5a shows a depiction to explain the derivation of the rotational speed limitation.

The sampling rate of the control device is 5 ms. Therefore, both supply voltage U and target trajectory $\omega_d(t)$ can be modified in these time steps. In a first step, here the trajectory is planned over a sampling cycle. This is shown in FIG. 5a.

At time j, the target rotational speed at time j+1 is selected such that it is the case both that manipulated quantity limitations are observed and also the current gradient does not exceed the required maximum. In the following, the calculation of the new target value $\omega_d^{j+1}$ is described in more detail. For this purpose, first it is necessary to calculate the regulation.

Calculation of the Regulation

For the regulation of the target rotational speed, a linear PI regulator is used. Thus, the regulator portion is made up of a proportional part and an integral part. Thus, the general regulator equations can be written as follows in discretized notation:

$$U_{PI}^j = \underbrace{k_p(\omega_d^j - \omega_{meas}^j)}_{U_j^P} + \underbrace{k_i \sum_{l=1}^{j}(\omega_d^l - \omega_{meas}^l)}_{U_j^i}$$

Figure 5B:
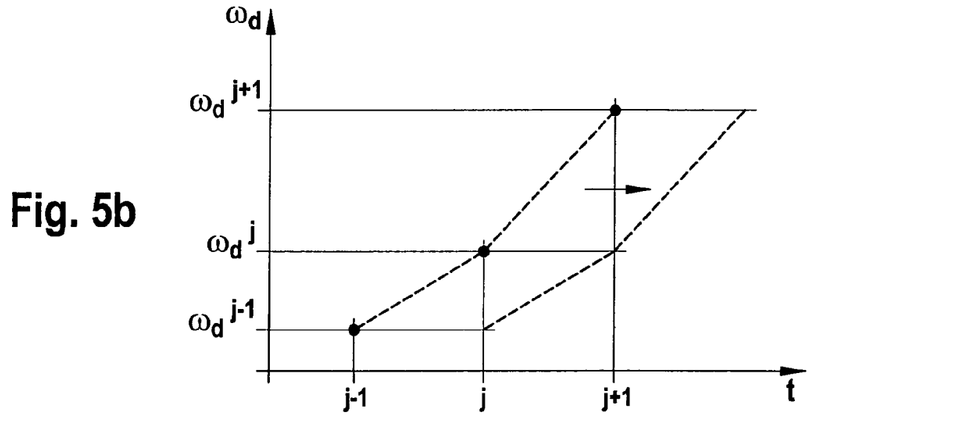
FIG. 5b shows a depiction to explain the derivation of the rotational speed limitation.

However, here the fact must be taken into account that the supply voltage U associated with time j is not outputted until time j+1, so that the target trajectory is shifted by a sampling cycle. This fact is illustrated in FIG. 5b.

Thus, in the regulator the current rotational speed is compared with the target rotational speed of the last cycle.

Thus, the following equation results for the regulator:

$$U_{PI}^j = (k_p + k_i)(\omega_d^{j-1} - \omega_{meas}^j) + I \quad (3.1)$$

Controlling and Regulation

Manipulated quantity U is made up of pre-controlling $U_d$ and regulation $U_{PI}$:

$$U = U_d + U_{PI} = \frac{RJ}{K}\dot{\omega}_d + K\omega_d + \frac{R}{K}T_{load} + U_{PI}. \quad (3.2)$$

Here, the rotational speed and angular acceleration used in the controlling still have to be determined. The angular acceleration is determined by linear interpolation of the target rotational speed at times j and j+1:

$$\dot{\omega}_d = \frac{\omega_d^{j+1} - \omega_d^j}{\Delta t} \quad (3.3)$$

Thus, manipulated quantity $U^{j+1}$ at time j+1 results from:

$$U^{j+1} = \underbrace{\left(\frac{RJ}{K\Delta t}\right)}_{k_1}\omega_d^{j+1} + \underbrace{\left(K - \frac{RJ}{K\Delta t}\right)}_{k_2}\omega_d^j + \frac{R}{K}T_{load}^j + U_{PI}^j. \quad (3.4)$$

Here care is to be taken that only the control portion is dependent on the new target quantity $\omega_d^{j+1}$. In the following, this equation is used in order to prevent limitations of manipulated quantities.

Maintenance of Manipulated Quantity Limitations

The rotational speed regulation unit obtains a target rotational speed from higher-order functions. However, it cannot be guaranteed that the pump is capable of executing this speed. Therefore, at the next time (j+1) the target rotational speed should be modified such that manipulated quantity limitations are fulfilled, and the rotational speed can therefore be achieved by the pump. In the following, (3.4) is used to calculate an upper limit $\omega^{j+1}{}_{max}$ and a lower limit $\omega^{j+1}{}_{min}$ for the target rotational speed, within which the manipulated quantity limitations are to be held. The target rotational speed is limited by the limits:

$$\omega_{mod}^{j+1} = \begin{cases} \omega_{min}^{j+1} & w_d^{j+1} < \omega_{min}^{j+1} \\ \omega_d^{j+1} & \text{for } \omega_{min}^{j+1} \le \omega_d^{j+1} \le \omega_{max}^{j+1} \\ \omega_{max}^{j+1} & \omega_d^{j+1} > \omega_{max}^{j+1} \end{cases} \quad (4.1)$$

The two limits can be calculated using (3.4). By solving (3.4) for $\omega^{j+1}$ and putting in the maximum voltage, the upper limit is obtained:

$$\omega_{max}^{j+1} = \frac{1}{k_1}\left(U_{max} - k_2\omega_d^j - \frac{R}{K}T_{load}^j - U_{PI}^j\right). \quad (4.2)$$

Putting in the minimum voltage $U = U_{min}$, yields the lower limit.

$$\omega_{min}^{j+1} = \frac{1}{k_1}\left(U_{min} - k_2\omega_d^j - \frac{R}{K}T_{load}^j - U_{PI}^j\right) \quad (4.3)$$

Thus, using (4.1)-(4.3), it can be assured that manipulated quantity limitations are maintained. However, very large current gradients can still occur. The limitation of the current gradients is described below.

Limitation of the Current Gradients a. Limitation of the Motor Current Gradient

From the moment-balance system (1.1), the current im at time m can be expressed dependent on the load moment and the angular acceleration.

$$i^m = \frac{1}{K}(T_{load}^m + J\dot{\omega}^m). \quad (5.1)$$

For the limitation of the current gradient, the modification of the current between the sampling steps is decisive. Using (5.1), the current modification can be determined dependent on the change in the load moment and the change in the angular acceleration:

$$\Delta i^{j+1} = i^{j+1} - i^j = \frac{J}{K}(\dot{\omega}^{j+1} - \dot{\omega}^j) + \frac{1}{K}(T_{load}^{j+1} - T_{load}^j) \quad (5.2)$$

Putting in the maximum allowed current change $\Delta i_{max}$ yields the maximum angular acceleration:

$$\dot{\omega}_{max}^{j+1} = \frac{K}{J}\Delta i_{max} + \dot{\omega}^j - \frac{1}{J}\underbrace{(T_{load}^{j+1} - T_{load}^j)}_{\approx T_{load}^j - T_{load}^{j-1}}. \quad (5.3)$$

Here it is to be noted that the change in the load moment due to the unknown load moment at time j+1 is approximated by the load moment change of the last cycle. Thus, through linear approximation of the angular acceleration, another condition is obtained for the new target rotational speed $\omega_d^{j+1}$:

$$\dot{\omega}_d^{j+1} = \frac{\omega^{j+1} - \omega^j}{\Delta t} \le \dot{\omega}_{max}^{j+1} \quad (5.4)$$

$$\omega_l^{j+1} = \omega^j + \Delta t \dot{\omega}_{max}^{j+1}. \quad (5.5)$$

Thus, in addition to the limitations from (4.1) the new target rotational speed is subject to the limitation $$\omega_d^{j+1} \le \omega_l^{j+1} \quad (5.6)$$

Under nominal conditions (no modeling errors, ideal load moment estimation), the allowed motor current gradient can thus be maintained through condition (5.6). It is to be noted that both modeling errors and errored load moment estimates can result in deviations.

b. Limitation of the Battery Current Gradient

Figure 5C:
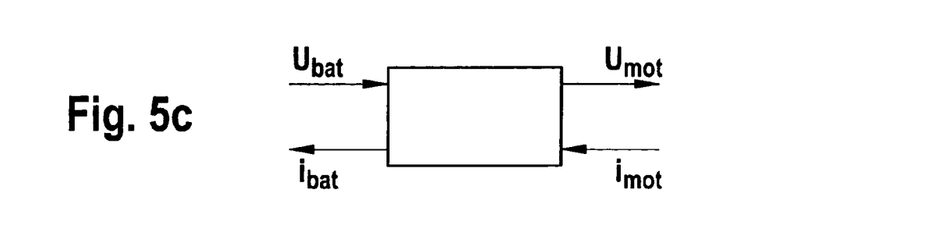
FIG. 5c shows a depiction to explain the derivation of the rotational speed limitation.

The decisive factor for the load on the vehicle electrical system is not directly the motor current $i_{mot}$, but rather the battery current $i_{bat}$ required by the PWM generator. FIG. 5c shows the PWM generator and its interfaces.

Due to the smoothing of the battery current by filters and the high clock frequency, here averaged direct voltages are assumed. Dependent on the PWM sample ratio and the battery voltage, the motor voltage is calculated as follows:

$$U_{mot} = PWM \cdot U_{bat}. \quad (5.7)$$

If the energy balance of the PWM generator is taken into account:

$$U_{bat} i_{bat} = U_{mot} i_{mot}$$

the following is obtained for the battery current:

$$i_{bat} = i_{mot} PWM. \quad (5.8)$$

For the current gradients of the battery voltage, the following thus holds:

$$\dot{i}_{bat} = \dot{i}_{mot} PWM + i_{mot} \dot{P}WM$$

or, written with differences, there follows:

$$\Delta i_{bat}^{j+1} = \Delta i_{mot}^{j+1} PWM^j + i_{mot}^j \Delta PWM^{j+1}. \quad (5.9)$$

Here, the motor current of the last cycle $i_{mot}^j$ and the $PWM^j$ can be calculated from known quantities of the last cycle:

$$i_{mot}^j = \frac{U^j - K\omega_d^j}{R} \quad (5.10)$$

$$PWM^j = \frac{U^j}{U_{batt}}.$$

The motor current difference can be expressed as follows, with the help of the motion equation:

$$\Delta i^{j+1} = i^{j+1} - i^j = \frac{J}{K}(\dot{\omega}^{j+1} - \dot{\omega}^j) + \frac{1}{K}\underbrace{(T_{load}^{j+1} - T_{load}^j)}_{\approx (T_{load}^j - T_{load}^{j-1}) = \Delta T} \quad (5.11)$$

If the angular acceleration of the j+1 cycle is replaced by the corresponding difference approximation, the following is obtained:

$$\Delta i^{j+1} = \frac{J}{K}\left(\frac{\omega^{j+1} - \omega^j}{\Delta t} - \dot{\omega}^j\right) + \frac{1}{K}\Delta T \quad (5.12)$$

$$= \underbrace{\frac{J}{K\Delta t}}_{k_3}\omega^{j+1} \underbrace{-\frac{J}{K\Delta t}\omega^j - \frac{J}{K}\dot{\omega}^j}_{k_4} + \frac{\Delta T}{K}.$$

The change in the PWM is calculated from the quotient of supply voltage U and battery voltage $U_{bat}$:

$$\Delta PWM^{j+1} = PWM^{j+1} - PWM^j = \frac{U^{j+1}}{U_{batt}} - PWM^j. \quad (5.13)$$

The calculation of the supply voltage U was already derived above (see (3.4)):

$$U^{j+1} = \underbrace{\left(\frac{RJ}{K\Delta t}\right)}_{k_1}\omega^{j+1} + \underbrace{\left(-\frac{RJ}{K\Delta t} + K\right)}_{k_2}\omega^j + \underbrace{\frac{R}{K}T_{load}^j}_{k_5}. \quad (5.14)$$

In order to prevent feedback effects of the regulation on the trajectory planning, here the regulation portion is ignored.

If this is put into the change of the PWM:

$$\Delta PWM^{j+1} = \frac{k_1 \omega^{j+1} + k_5}{U_{batt}} - PWM^j \quad (5.15)$$

$$= \underbrace{\frac{k_1}{U_{batt}}}_{k_6}\omega^{j+1} + \underbrace{\frac{k_5}{U_{batt}}}_{k_7} - PWM^j$$

Putting (5.12) and (5.15) into (5.9), the following is obtained:

$$\Delta i_{batt}^{j+1} = (k_3\omega^{j+1} + k_4)PWM^j + i_{mot}^j(k_6\omega^{j+1} + k_7) \quad (5.16)$$

$$= \omega^{j+1}\underbrace{(k_3 PWM^j + k_6 i_{mot}^j)}_{k_8} + \underbrace{k_4 PWM^j + k_7 i_{mot}^j}_{k_9}$$

Or, solved for rotational speed $\omega^{j+1}$:

$$\omega^{j+1} = \frac{1}{k_8}\left(\Delta i_{batt}^{j+1} - k_9\right) \quad (5.17)$$

If the maximum allowed value is put in for the battery current change, the associated target rotational speed is obtained:

$$\omega_i^{j+1} = \frac{1}{k_8}\left(\Delta i_{batt}^{max} - k_9\right) \quad (5.18)$$

What is claimed is:

1. A method for controlling an electric motor, the method comprising:
    supplying the electric motor with electrical energy as a motor current from at least one of a battery and a generator; and
    applying, for the controlling, a high-frequency pulse-width-modulated voltage to the electric motor;
    wherein the motor current, which is supplied from the at least one of the battery and the generator during a starting up of the electric motor for operating the electric motor, is continuously increased;
    wherein the increase of the motor current in a prespecifiable time period is limited to a prespecified target value;
    wherein for the limitation of the current gradient of the motor current, the electric motor is operated at most with a prespecified target rotational speed, the target rotational speed being prespecified based on at least one of (i) a battery voltage, and (ii) a load moment at the electric motor.

2. A device for controlling an electric motor, supplied with electrical energy as a motor current by at least one of a battery and a generator, comprising:
    a control arrangement to control the electric motor using a high-frequency pulse-width-modulated voltage applied to the electric motor, and to continuously increase a motor current, supplied for operating the electric motor from the at least one of the battery and the generator, during a startup of the electric motor;
    wherein, in a prespecifiable time period, the arrangement limits the increase of the motor current to a prespecified target value; and
    wherein the electric motor for the limitation of the current gradient of the motor current is operated at most with a prespecified target rotational speed, the target rotational speed being prespecified based on at least one of a battery voltage and a load moment at the electric motor.

* * * * *

UNITED STATES PATENT AND TRADEMARK OFFICE
CERTIFICATE OF CORRECTION

PATENT NO.        : 8,653,775 B2                                     Page 1 of 1
APPLICATION NO.   : 12/086832
DATED             : February 18, 2014
INVENTOR(S)       : Schanzenbach et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1538 days.

Signed and Sealed this

Twenty-ninth Day of September, 2015

Michelle K. Lee
*Director of the United States Patent and Trademark Office*